US012681332B2

(12) United States Patent
Li et al.

(10) Patent No.: US 12,681,332 B2
(45) Date of Patent: Jul. 14, 2026

(54) PHOTOCHROMIC LENS WITH BIFOCAL FILM LAYER AND PREPARATION METHOD FOR PHOTOCHROMIC LENS

(71) Applicant: JIANGSU MAAT OPTICAL TECHNOLOGY CO., LTD., Zhenjiang (CN)

(72) Inventors: Jun Li, Jiangsu (CN); Jianguo Shang, Jiangsu (CN)

(73) Assignee: Jiangsu Maat Optical Technology Co., Ltd., Zhenjiang (CN)

( * ) Notice: Subject to any disclaimer, the term of this patent is extended or adjusted under 35 U.S.C. 154(b) by 310 days.

(21) Appl. No.: 18/288,917

(22) PCT Filed: Jun. 2, 2021

(86) PCT No.: PCT/CN2021/097823
§ 371 (c)(1),
(2) Date: Oct. 30, 2023

(87) PCT Pub. No.: WO2022/227224
PCT Pub. Date: Nov. 3, 2022

(65) Prior Publication Data
US 2024/0201519 A1 Jun. 20, 2024

(30) Foreign Application Priority Data
Apr. 30, 2021 (CN) .......................... 202110478043.0

(51) Int. Cl.
*G02C 7/10* (2006.01)
*C09D 7/63* (2018.01)
(Continued)

(52) U.S. Cl.
CPC .............. *G02C 7/102* (2013.01); *C09D 7/63* (2018.01); *C09D 163/10* (2013.01); *G02C 7/06* (2013.01)

(58) Field of Classification Search
CPC . G02C 7/102; G02C 7/06; C09D 7/63; C09D 163/10; C09D 171/02;
(Continued)

(56) References Cited

U.S. PATENT DOCUMENTS 5,531,940 A * 7/1996 Gupta ................ B29D 11/0073
252/586
11,921,359 B2 * 3/2024 Glöge ................. B32B 17/1055

FOREIGN PATENT DOCUMENTS

CN 204287629 4/2015
CN 204719339 10/2015
(Continued)

OTHER PUBLICATIONS

Chinese Patent Office, International Search Report, Dec. 7, 2021.

*Primary Examiner* — Tuyen Tra
(74) *Attorney, Agent, or Firm* — Bay State IP, LLC

(57) ABSTRACT

The present disclosure relates to a preparation method for a photochromic lens with a bifocal film layer. A photochromic lens with a bifocal film layer includes a substrate, a treatment layer, and a photochromic layer from inside to outside, where the photochromic layer is cured on a surface of the treatment layer by means of ultraviolet irradiation. According to the preparation method for a photochromic lens having a bifocal film layer provided in the present disclosure, a bifocal lens is used as a lens substrate, and photochromic and bifocal technologies are combined to overcome the defect of non-uniformity of a bifocal film layer caused by a spin-coating method, such that a photochromic layer can be uniformly attached to a surface of the lens substrate. Thus, uniform photochromism and excellent performance are achieved, and it can be ensured that the surface shape luminosity of the bifocal lens substrate is not affected.

9 Claims, 3 Drawing Sheets

(51) Int. Cl.
   *C09D 163/10*          (2006.01)
   *G02C 7/06*          (2006.01)

(58) Field of Classification Search
   CPC ........ B29D 11/00028; B29D 11/00413; B29D
                       11/00653; B29D 11/0073; B29D
                                                    11/00884
   USPC ................................ 351/41, 159.01, 159.41
   See application file for complete search history.

(56)                    References Cited

FOREIGN PATENT DOCUMENTS

CN          105259673          1/2016
CN          105670602          6/2016
KR       20090120808          11/2009

* cited by examiner

1- Comparative Embodiment
2- Embodiment

PHOTOCHROMIC LENS WITH BIFOCAL FILM LAYER AND PREPARATION METHOD FOR PHOTOCHROMIC LENS

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/CN2021/097823 filed on Jun. 2, 2021, and which in turn claims priority under 35 USC 119 to Chinese Patent Application No. 202110478043.0 filed on Apr. 30, 2021, the disclosure of which is incorporated by reference herein in its entirety as part of the present application.

TECHNICAL FIELD

The present disclosure relates to the technical field of lens manufacturing processes, and specifically relates to a photochromic lens with a bifocal film layer, and a preparation method for the photochromic lens.

BACKGROUND

Bifocal lens is a lens that can effectively increase the ciliary muscle strength of myopia patients, expand the accommodation reserve, improve the vision of ametropia eyes and reduce refractive power, which is especially suitable for teenagers. The structure of the bifocal lens includes a main lens and a segment lens. The main lens is a distance portion, and the segment lens is a near portion. Photochromic lens, which is originally a colorless and transparent lens, can be changed into tinted lens with low transmittance in a strong light environment, thus achieving the effects of reducing harmful light and protecting eyes from injury. The bifocal photochromic lens is integrally cast, which is deeper in photochromism and slower in fading in a near light area, and the photochromism is only at the refractive index of 1.56 and 1.60, affecting the wearing effect.

In the prior art, in the current photochromic bifocal lenses, the photochromic liquid is attached to the lenses by soaking or spin-coating. When the method is used for bifocal lenses, it is easy to cause nonuniform coating thickness of the segment lens, and the accurate luminosity of the segment lens cannot be guaranteed, and it is easy to cause nonuniform photochromism, film layer peeling and other phenomena. Film-pasting and other forms cannot achieve desired photochromic performance.

In view of the defects in the above prior art, based on the rich experience and professional knowledge in such materials for many years, the inventor has made research and innovation with theoretical analysis, and developed a photochromic lens with a bifocal film layer and a preparation method for the photochromic lens with the bifocal film layer. A bifocal lens is used as a lens substrate, and photochromic and bifocal technologies are combined to make a photochromic layer uniformly attached to a surface of the lens substrate. Thus, uniform photochromism and excellent performance are achieved, and it can be ensured that the surface shape luminosity of the bifocal lens substrate is not affected.

SUMMARY

An objective of the present disclosure is to provide a preparation method for a photochromic lens with a bifocal film layer. A bifocal lens is used as a lens substrate, and photochromic and bifocal technologies are combined to make a photochromic layer uniformly attached to a surface of the lens substrate. Thus, uniform photochromism and excellent performance are achieved, and it can be ensured that the surface shape luminosity of the bifocal lens substrate is not affected.

The technical objective of the present disclosure is achieved through the following technical solution:

A photochromic lens with a bifocal film layer provided by the present disclosure includes a substrate, a treatment layer and a photochromic layer from inside to outside. The photochromic layer is cured on a surface of the treatment layer by means of ultraviolet irradiation, and the substrate is an E-line bifocal lens or a flat-top bifocal lens.

Further, the substrate includes a main lens and a segment lens, the main lens is a distance-viewing structure, and the segment lens is a near-viewing part.

Further, a transparent polymer material for optics is any one of polycarbonate, polymethylmethacrylate, or polymer alloy.

Further, materials of the treatment layer include the following components in parts by weight: 50-80 parts of bisphenol A epoxy acrylic resin, 5-8 parts of dioctyl adipate, 2-5 parts of vinyl trimethoxy silane, and 1-3 parts of tetrabutylammonium chloride.

In the present disclosure, the bisphenol A epoxy acrylic resin is a photocuring main body, and after photocuring, a cured film is formed on the surface of the substrate, which can be adhered to acrylate in the photochromic layer in an affinitive manner. Due to the lack of flexibility and brittleness of the cured film of mono-bisphenol A epoxy acrylic resin, the added dioctyl adipate is a compliant modification component, which makes the cured film have a certain ductility and toughness. Vinyl trimethoxy silane, as a silane coupling agent, can better adhere the cured film to the substrate. Tetrabutylammonium chloride is mainly used as quaternary ammonium salt catalyst, and other catalysts with the same property can also be used as equivalent substitutions. The purpose of providing the treatment layer between the photochromic layer and the lens substrate in the present disclosure is to improve the adhesion between the photochromic layer and the substrate, such that the photochromic layer is free of problems such as sagging in the curing process, and the uniformity of the photochromic layer is improved while the peeling resistance of the photochromic layer is improved.

Further, the photochromic layer includes the following components in mass fraction: 30%-70% of bisphenol A dimethacrylate, 10%-60% of poly(ethylene glycol) diacrylate, 10%-30% of polyfunctional acrylate monomer, and the rest of photoinitiator, with a total of 100%.

Further, a transparent polymer material for optics is any one of polycarbonate, polymethylmethacrylate, or polymer alloy.

Further, bisphenol A dimethacrylate is at least one of ethoxylated bisphenol A dimethacrylate containing 2-20 repeating units of ethoxy, propoxylated bisphenol A dimethacrylate containing 2-20 repeating units of propoxy, alkoxylated bisphenol A dimethacrylate containing 2-20 repeating units of epoxy and propoxy, and glycerylated bisphenol A dimethacrylate and bisphenol A glycerylated (1-glycerol/phenol) dimethacrylate.

Further, the polyfunctional acrylate monomer is at least one of dipentaerythritol hexaacrylate, dipentaerythritol hydroxy pentaacrylate, pentaerythritol tetraacrylate, pentaerythritol triacrylate, trimethylolpropane trimethylacrylate, propoxylated glycerol triacrylate, and trimethylolpropane ethoxy triacrylate.

Further, the poly(ethylene glycol) diacrylate is poly(ethylene glycol) diacrylate containing 2-20 repeating units of ethoxy, or poly(ethylene glycol) diacrylate containing 2-20 repeating units of propoxy.

Further, the substrate is an E-line bifocal lens, or a flat-top bifocal lens.

Further, the segment lens is a prism structure with an inward substrate.

Further, the external mold is a bifocal glass mold.

Further, a preparation method for the photochromic lens with a bifocal film layer provided by the present disclosure specifically includes the following operation steps:

S1: uniformly spin-coating a treatment layer on surface of a substrate;

S2: placing the substrate obtained in Step S1 in an external mold adapted to a shape and structure of the substrate, reserving a gap between the external mold and the substrate, and fixing the external and the substrate with an adhesive tape;

S3: injecting a photochromic material into the gap of Step S2 to fill and seal the gap;

S4: curing the photochromic material by means of ultraviolet irradiation to form a photochromic layer; and S5: demolding to obtain the photochromic material with a bifocal film layer.

As the lens of bifocal photochromic glasses includes a main lens and a segment lens, when a spin-coating method is adopted, a height difference between the main lens and the segment lens causes nonuniformity of the bifocal photochromic layer, and when the light changes, the photochromism is nonuniform. If the method of integral casting is adopted, photochromic materials with high photochromic sensitivity and wide photochromic range cannot be used, which leads to deep photochromism and slow photochromism in a near light area, and the photochromism only at the refractive index of 1.56 and 1.60, which affects the wearing of the glasses. However, according to the method provided by the present disclosure, the uniformity of the photochromic film can be guaranteed by injecting the photochromic material into the gap and then curing the photochromic material, and the color changes quickly and uniformly in the near light area. By adjusting the width of the gap, the thickness of a photochromic film can be controlled, so as to improve the wearing effect of the bifocal photochromic glasses.

As the preferable technical solution, the preparation method provided by the present disclosure specifically includes the following operation steps:

S1: uniformly spin-coating the treatment layer on the surface of the substrate;

S2: placing the substrate obtained in Step S1 in the external mold adapted to the shape and structure of the substrate, reserving a gap, which is preferably 4 mm, between the external mold and the substrate, where the gap is a thickness of the photochromic layer, and fixing the external and the substrate with an adhesive tape;

S3: injecting the photochromic material into the gap of Step S2 to fill and seal the gap;

S4: curing the photochromic material by means of ultraviolet irradiation for 2 min to form the photochromic layer; and S5: demolding to obtain the photochromic material with a bifocal film layer.

Further, in Step S3, an injection hole is punched in the adhesive tape, the photochromic material is injected into the gap through the injection hole with a syringe, and then the hole is sealed with the adhesive tape.

Further, in Step S3, a vent hole is punched in the adhesive tape, and the vent hole is adjacent to the injection hole. When the photochromic material overflows from the vent hole, it is determined that the gap has been filled with the photochromic material. Small fluidity of the photochromic material is not conducive for the photochromic material to enter the gap. The existence of the vent hole can maintain the air pressure balance between the gap and the outside, thus facilitating the injection of the photochromic material. It can be determined that the gap is filled with the photochromic material through the overflow of the photochromic material, which ensures that the gap can be filled with the photochromic material. Bubbles inside the photochromic material and bubbles introduced in the injection process are eliminated through the extrusion of the surface tension of the photochromic material, such that the uniformity of photochromic film and the wearing effect of lenses are improved.

As the preferable technical solution, the preparation method provided by the present disclosure specifically includes the following operation steps:

S1: uniformly spin-coating the treatment layer on the surface of the substrate;

S2: placing the substrate obtained in Step S1 in the external mold adapted to the shape and structure of the substrate, reserving a gap, which is preferably 5 mm, between the external mold and the substrate, and fixing the external and the substrate with an adhesive tape;

S3: injecting the photochromic material into the gap of Step S2, adjusting the gap to 4 mm when the photochromic material is filled to $\frac{1}{2}$-$\frac{2}{3}$ of the volume of the gap, wherein the gap is a thickness of the photochromic layer, and continuously injecting the photochromic material until the gap is filled and sealed with the photochromic material;

S4: curing the photochromic material by means of ultraviolet irradiation for 2 min to form the photochromic layer; and S5: demolding to obtain the photochromic material with a bifocal film layer.

Due to large viscosity and low fluidity of the photochromic material, bubbles are easily introduced or nonuniform contact with a contact surface may occur during the injection process, resulting in the phenomenon that the photochromic film contains tiny bubbles or is nonuniformly cured. In the present disclosure, after the photochromic material is filled to 1/2-2/3 of the volume of the gap, the gap is narrowed, causing a certain pressure on the photochromic material in the gap, such that a cambered surface of the lens is completely immersed in the photochromic material. Through the wettability of the treatment layer, there is no slit between the photochromic material and the lens, and the remaining bubbles in the photochromic material are squeezed out by pressure.

Further, in Step S1, the treatment layer is uniformly spin-coated on the surface of the substrate, and the substrate coated with the treatment layer is irradiated with an ultraviolet curing light source for 1 min. After irradiating for 1 min, the material of the treatment layer is in a semi-dry state, the adhesion between the treatment layer and the photochromic is improved while guaranteeing the adhesion between the treatment layer and the substrate.

In conclusion, the present disclosure has the following beneficial effects:

According to the preparation method for a photochromic lens having a bifocal film layer provided in the present disclosure, a bifocal lens is used as a lens substrate, and photochromic and bifocal technologies are combined to overcome the defect of non-uniformity of a bifocal film layer caused by a spin-coating method, such that a photochromic layer can be uniformly attached to a surface of the lens substrate. Thus, uniform photochromism and excellent performance are achieved, and it can be ensured that the surface shape luminosity of the bifocal lens substrate is not affected.

1—substrate; 2—treatment layer; 3—photochromic layer; 11—main lens; 12—segment lens.

DETAILED DESCRIPTION OF THE EMBODIMENTS

In order to further illustrate the technical means and efficacy adopted by the present disclosure to achieve the intended purpose of the present disclosure, the specific embodiments, characteristics and efficacy of the preparation method for a photochromic lens with a bifocal film layer provided in accordance with the present disclosure are described in detail as follows.

Materials used in the embodiment are commercially available.

The materials are from the following table:

| Material | Manufacturer |
| --- | --- |
| Propoxylated bisphenol A dimethacrylate containing 2-20 repeating units of propoxy | BASF (Original Cognis) |
| Poly(ethylene glycol) diacrylate containing 2-20 repeating units of propoxy | BASF (Original Cognis) |
| Pentaerythritol tetraacrylate | BASF (Original Cognis) |
| Photoinitiator | CAC Nantong Chemical |
| Bisphenol A epoxy acrylic resin | BASF (Original Cognis) |
| Dioctyl adipate | Yuanli Chemical |
| Vinyl trimethoxy silane | Nanjing Capatue Chemical |
| Tetrabutylammonium chloride | Titan Science and technology (Reagent) |
| Ethoxylated bisphenol A dimethacrylate containing 2-20 repeating units of ethoxy | BASF (Original Cognis) |
| Poly(ethylene glycol) diacrylate | BASF (Original Cognis) |
| Dipentaerythritol hydroxy pentaacrylate | BASF (Original Cognis) |
| Bisphenol A epoxy acrylic resin | BASF (Original Cognis) |
| Dioctyl adipate | Yuanli Chemical |
| Vinyl trimethoxy silane | Nanjing Capatue Chemical |
| Alkoxylated bisphenol A dimethacrylate containing 2-20 repeating units of epoxy and propoxy | BASF (Original Cognis) |
| Poly(ethylene glycol) diacrylate containing 2-20 repeating units of ethoxy | BASF (Original Cognis) |

-continued

| Material | Manufacturer |
| --- | --- |
| Dipentaerythritol hydroxy pentaacrylate | BASF (Original Cognis) |
| Glycerylated bisphenol A dimethacrylate, and bisphenol A glycerylated (1-glycerol/phenol) dimethacrylate | BASF (Original Cognis) |
| Poly(ethylene glycol) diacrylate containing 2-20 repeating units of propoxy | BASF (Original Cognis) |
| Pentaerythritol triacrylate | BASF (Original Cognis) |
| Dipentaerythritol hexaacrylate | BASF (Original Cognis) |

The substrate is made of a transparent polymer material for optics with a refractive index of 1.50-1.74, which is any one of polycarbonate, polymethylmethacrylate or polymer alloy, and is commercially available.

Embodiment 1

Figure 2:
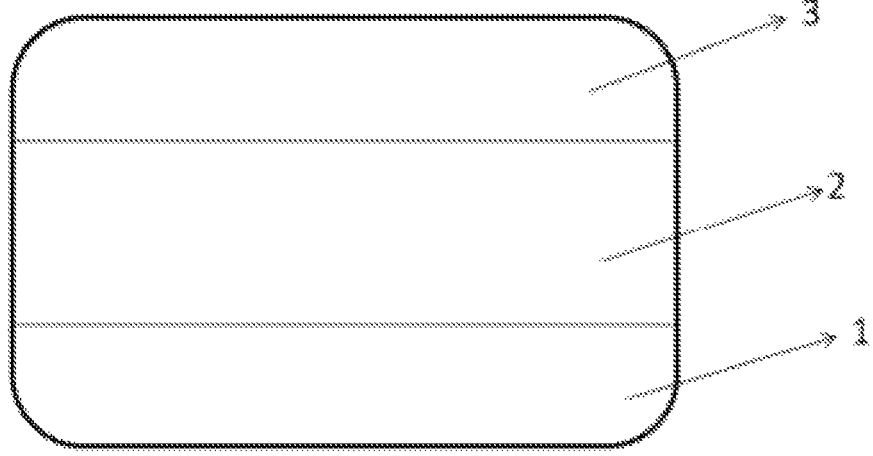
FIG. 2 is a schematic diagram of a preparation process according to Embodiments 1-5 of the present disclosure.
Figure 3:
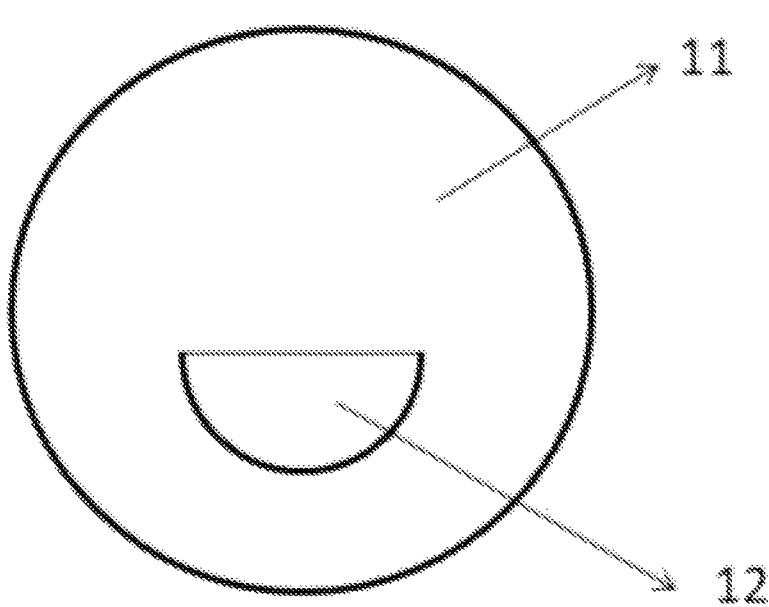
FIG. 3 is a structural schematic diagram of a substrate according to Embodiment 1 of the present disclosure.

A photochromic lens with a bifocal film layer, as shown in FIG. 2, includes a substrate 1, a treatment layer 2 and a photochromic layer 3 from inside to outside. The photochromic layer 3 is cured on a surface of the treatment layer 2 by means of ultraviolet irradiation. The photochromic layer 3 includes the following components in mass fraction: 30% of propoxylated bisphenol A dimethacrylate containing 2-20 repeating units of propoxy, 60% of poly(ethylene glycol) diacrylate containing 2-20 repeating units of propoxy, 10% pentaerythritol tetraacrylate, and the rest of photoinitiator, with a total of 100%. The material of the treatment layer includes the following components in parts by weight: 50 parts of bisphenol A epoxy acrylic resin, 5 parts of dioctyl adipate, 2 parts of vinyl trimethoxy silane, and 1 part of tetrabutylammonium chloride. As shown in FIG. 3, the substrate 1 is an E-line bifocal lens, including a main lens 11, and a segment lens 12. The main lens 11 is a distance-viewing structure, and the segment lens 12 is a near-viewing part.

A preparation method for the photochromic lens with a bifocal film layer provided by the present disclosure specifically includes the following operation steps:

S1. A treatment layer 2 is uniformly spin-coated on a surface of a substrate 1.

S2. The substrate 1 obtained in Step S1 is placed in an external mold adapted to a shape and structure of the substrate 1, a gap is reserved between the external mold and the substrate 1 and the external mold and the substrate 1 are fixed with an adhesive tape.

S3. A photochromic material is injected into the gap of Step S2 to fill and seal the gap.

S4. The photochromic material is cured by means of ultraviolet irradiation to form a photochromic layer 3.

S5: Demolding is conducted to obtain the photochromic material with a bifocal film layer.

Embodiment 2

Figure 4:
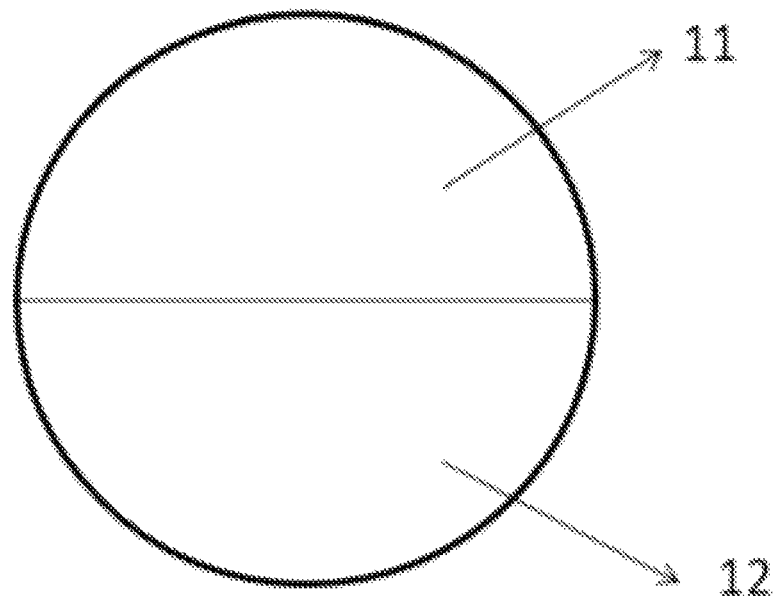
FIG. 4 is a structural schematic diagram of a substrate according to Embodiments 2-5 of the present disclosure.

A photochromic lens with a bifocal film layer, as shown in FIG. 2, includes a substrate 1, a treatment layer 2 and a photochromic layer 3 from inside to outside. The photochromic layer 3 is cured on a surface of the treatment layer 2 by means of ultraviolet irradiation. The photochromic layer 3 includes the following components in mass fraction: 40% of ethoxylated bisphenol A dimethacrylate containing 2-20 repeating units of ethoxy, 45% of poly(ethylene glycol)

diacrylate, 15% of dipentaerythritol hydroxyl pentaacrylate, and the rest of photoinitiator, with a total of 100%. The material of the treatment layer includes the following components in parts by weight: 60 parts of bisphenol A epoxy acrylic resin, 6 parts of dioctyl adipate, 4 parts of vinyl trimethoxy silane, and 2 parts of tetrabutylammonium chloride. As shown in FIG. 4, the substrate 1 is a flat-top bifocal lens, including a main lens 11, and a segment lens 12. The main lens 11 is a distance-viewing structure, and the segment lens 12 is a near-viewing part.

Figure 1:
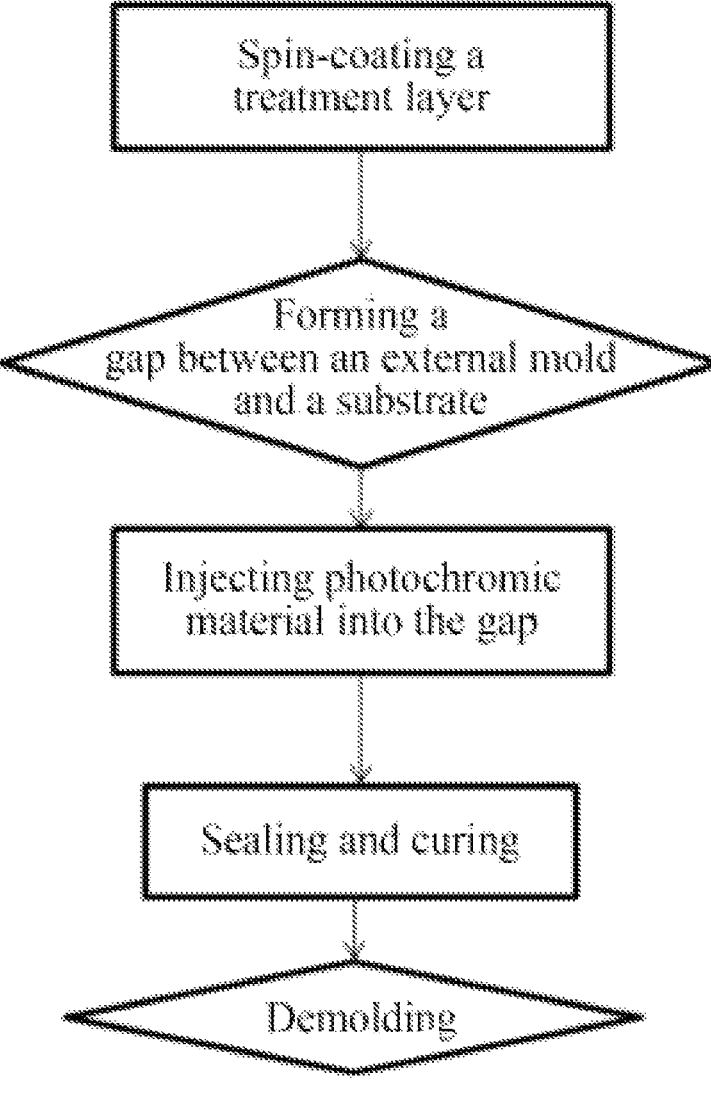
FIG. 1 is a flow diagram of a preparation method according to the present disclosure.

A preparation method for the photochromic lens with a bifocal film layer, as shown in FIG. 1, specifically includes the following operation steps:

S1. A treatment layer is uniformly spin-coated on the surface of a substrate.

S2. The substrate obtained in Step S1 is placed in the external mold adapted to the shape and structure of the substrate, a gap, which is preferably 4 mm, is reserved between the external mold and the substrate, where the gap is a thickness of the photochromic layer, and the external and the substrate are fixed with an adhesive tape.

S3. An injection hole is punched in the adhesive tape, a photochromic material is injected into the gap through the injection hole with a syringe, and then the hole is sealed with the adhesive tape.

S4. The photochromic material is cured by means of ultraviolet irradiation to form the photochromic layer 3.

S5. Demolding is conducted to obtain the photochromic material with a bifocal film layer.

The substrate 1 includes a main lens 11 and a segment lens 12, the main lens 11 is a distance-viewing structure, and the segment lens 12 is a near-viewing part. The segment lens 11 is a prism structure with an inward substrate, and the external mold is a bifocal glass mold.

Embodiment 3

A photochromic lens with a bifocal film layer, as shown in FIG. 2, includes a substrate 1, a treatment layer 2 and a photochromic layer 3 from inside to outside. The photochromic layer 3 is cured on a surface of the treatment layer 2 by means of ultraviolet irradiation. The photochromic layer 3 includes the following components in mass fraction: 55% of alkoxylated bisphenol A dimethacrylate containing 2-20 repeating units of epoxy and propoxy, 35% of poly(ethylene glycol) diacrylate containing 2-20 repeating units of ethoxy, 10% of dipentaerythritol hydroxyl pentaacrylate, and the rest of photoinitiator, with a total of 100%. The material of the treatment layer includes the following components in parts by weight: 75 parts of bisphenol A epoxy acrylic resin, 7 parts of dioctyl adipate, 4 parts of vinyl trimethoxy silane, and 2 parts of tetrabutylammonium chloride. The substrate 1 is a flat-top bifocal lens, including a main lens 11, and a segment lens 12. The main lens 11 is a distance-viewing structure, and the segment lens 12 is a near-viewing part.

A preparation method for the photochromic lens with a bifocal film layer, as shown in FIG. 1, specifically includes the following operation steps:

S1. A treatment layer is uniformly spin-coated on the surface of a substrate.

S2. The substrate obtained in Step S1 is placed in the external mold adapted to the shape and structure of the substrate, a gap, which is preferably 5 mm, is reserved between the external mold and the substrate, where the gap is a thickness of the photochromic layer, and the external and the substrate are fixed with an adhesive tape.

S3. A photochromic material is injected into the gap of Step S2, when the photochromic material is filled to ½ to ⅔ of the volume of the gap, the gap is adjusted to 4 mm, the photochromic material is continuously injected until the gas is filled and sealed with the photochromic material.

S4. The photochromic material is cured by means of ultraviolet irradiation to form the photochromic layer 3.

S5. Demolding is conducted to obtain the photochromic material with a bifocal film layer.

Embodiment 4

A photochromic lens with a bifocal film layer, as shown in FIG. 2, includes a substrate 1, a treatment layer 2 and a photochromic layer 3 from inside to outside. The photochromic layer 3 is cured on a surface of the treatment layer 2 by means of ultraviolet irradiation. The photochromic layer 3 includes the following components in mass fraction: 50% of glycerylated bisphenol A dimethacrylate and bisphenol A glycerylated (1-glycerol/phenol) dimethacrylate, 20% of poly(ethylene glycol) diacrylate containing 2-20 repeating units of propoxy, 30% of pentaerythritol triacrylate, and the rest of photoinitiator, with a total of 100%. The material of the treatment layer includes the following components in parts by weight: 65 parts of bisphenol A epoxy acrylic resin, 5 parts of dioctyl adipate, 5 parts of vinyl trimethoxy silane, and 1 part of tetrabutylammonium chloride. As shown in FIG. 4, the substrate 1 is a flat-top bifocal lens, including a main lens 11, and a segment lens 12. The main lens 11 is a distance-viewing structure, and the segment lens 12 is a near-viewing part.

A preparation method for the photochromic lens with a bifocal film layer, as shown in FIG. 1, specifically includes the following operation steps:

S1. A treatment layer is uniformly spin-coated on the surface of a substrate.

S2. The substrate obtained in Step S1 is placed in the external mold adapted to the shape and structure of the substrate, a gap, which is preferably 5 mm, is reserved between the external mold and the substrate, where the gap is a thickness of the photochromic layer, and the external and the substrate are fixed with an adhesive tape.

S3. An injection hole and a vent hole are punched in the adhesive tape, and the vent hole is adjacent to the injection hole. When the photochromic material overflows from the vent hole, it can be determined that the gap has been filled with the photochromic material. The photochromic material is injected into the gap through the injection with the syringe, and then the hole is sealed with the adhesive tape. The photochromic material is injected into the gap of S2, when the photochromic material is filled to ½ to ⅔ of the volume of the gap, the gap is adjusted to 4 mm, the photochromic material is continuously injected until the gas is filled and sealed with the photochromic material.

S4. The photochromic material is cured by means of ultraviolet irradiation to form the photochromic layer 3.

S5. Demolding is conducted to obtain the photochromic material with a bifocal film layer.

The substrate 1 includes a main lens 11 and a segment lens 12, the main lens 11 is a distance-viewing structure, and the segment lens 12 is a near-viewing part. The segment lens 11 is a prism structure with an inward substrate, and the external mold is a bifocal glass mold.

Embodiment 5

A photochromic lens with a bifocal film layer, as shown in FIG. 2, includes a substrate 1, a treatment layer 2 and a photochromic layer 3 from inside to outside. The photochromic layer 3 is cured on a surface of the treatment layer 2 by means of ultraviolet irradiation. The photochromic layer 3 includes the following components in mass fraction: 45% of ethoxylated bisphenol A dimethacrylate containing 2-20 repeating units of ethoxy, 40% of poly(ethylene glycol) diacrylate containing 2-20 repeating units of ethoxy, 15% of dipentaerythritol hexaacrylate, and the rest of photoinitiator, with a total of 100%. The material of the treatment layer includes the following components in parts by weight: 55 parts of bisphenol A epoxy acrylic resin, 5 parts of dioctyl adipate, 4 parts of vinyl trimethoxy silane, and 2 parts of tetrabutylammonium chloride. The substrate 1 is a flat-top bifocal lens, including a main lens 11, and a segment lens 12. The main lens 11 is a distance-viewing structure, and the segment lens 12 is a near-viewing part.

A preparation method for the photochromic lens with a bifocal film layer, as shown in FIG. 1, specifically includes the following operation steps:

S1. A treatment layer is uniformly spin-coated on a surface of a substrate 1 and then is subjected to ultraviolet irradiation for 1 min.

S5. Demolding is conducted to obtain the photochromic material with a bifocal film layer.

The substrate 1 includes a main lens 11 and a segment lens 12, the main lens 11 is a distance-viewing structure, and the segment lens 12 is a near-viewing part. The segment lens 11 is a prism structure with an inward substrate, and the external mold is a bifocal glass mold.

Comparative Embodiment

A photochromic lens with a bifocal film layer includes a substrate, a treatment layer and a photochromic layer from inside to outside. The photochromic layer includes the following components in mass fraction: 56% of ethoxylated bisphenol A dimethacrylate containing 2-20 repeating units of ethoxy, 32% of poly(ethylene glycol) diacrylate containing 2-20 repeating units of ethoxy, 12% of dipentaerythritol hydroxy pentaacrylate, and the rest of photoinitiator, with a total of 100%. The substrate is a flat-top bifocal lens.

A preparation method for the flat-top bifocal lens is that a photochromic layer is uniformly coated on the substrate by means of a spin-coating method and then is cured.

Figure 5:
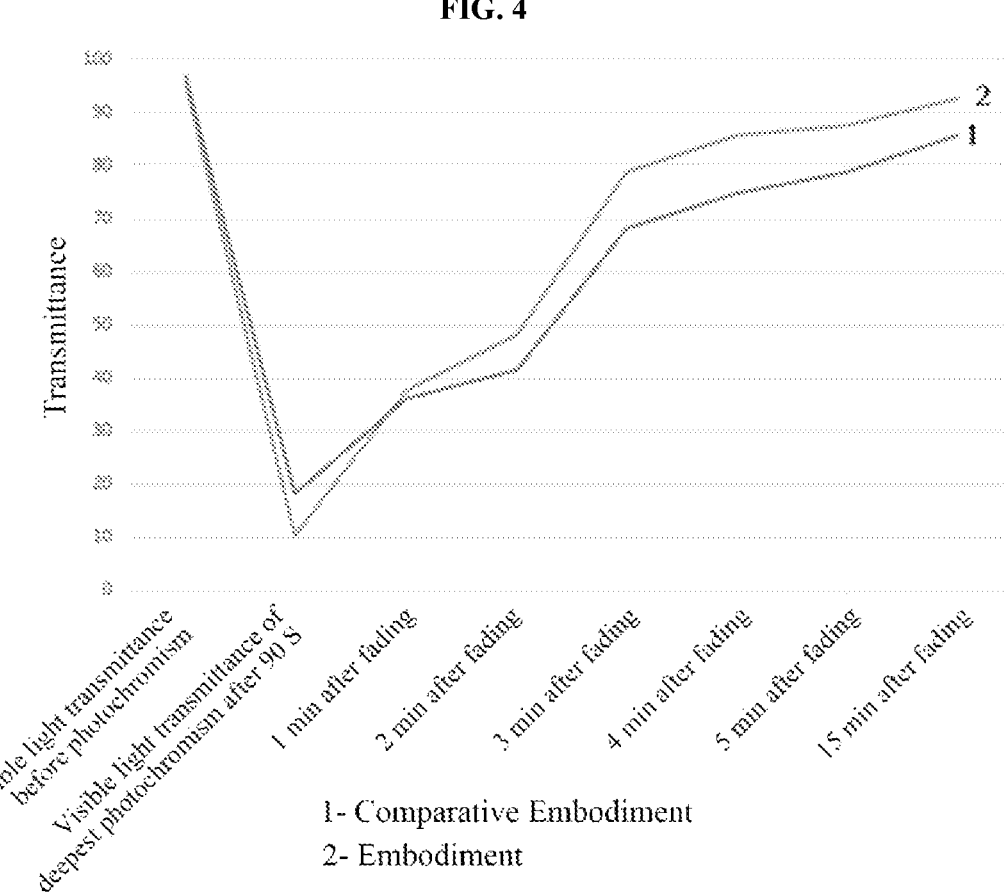
FIG. 5 shows photochromic time transmittance of Embodiment 1 and Comparative embodiment.

The photochromatic spectrum analysis (fading transmittance detection) of the lenses of Embodiment 1 and Comparative Embodiment is conduced, and the results are shown in Table 1 and FIG. 5. BYK transmission haze meter is used as the detection instrument, and the environmental condition is 23° C.

TABLE 1

Photochromic time transmittance of Embodiment 1 and Comparative Embodiment
Detailed parameters of detection sample

| | | | | Photochromic time transmittance/% | | | | | |
| Serial number | Sample name | Before photochromism | 90 S at the deepest photochromism | 1 minute after fading | 2 minutes after fading | 3 minutes after fading | 4 minutes after fading | 5 minutes after fading | 15 minutes after fading |
|---|---|---|---|---|---|---|---|---|---|
| 1 | Comparative Embodiment 1 | 96.8 | 18.5 | 36.2 | 41.5 | 68.3 | 74.7 | 78.7 | 85.8 |
| 2 | Embodiment 1 | 95.7 | 10.5 | 37.6 | 48.3 | 78.7 | 85.6 | 87.5 | 92.6 |

S2. The substrate obtained in Step S1 is placed in the external mold adapted to the shape and structure of the substrate, a gap, which is preferably 5 mm, is reserved between the external mold and the substrate, where the gap is a thickness of the photochromic layer, and the external and the substrate are fixed with an adhesive tape.

S3. An injection hole and a vent hole are punched in the adhesive tape, and the vent hole is adjacent to the injection hole. When the photochromic material overflows from the vent hole, it can be determined that the gap has been filled with the photochromic material. The photochromic material is injected into the gap through the injection with the syringe, and then the hole is sealed with the adhesive tape. The photochromic material is injected into the gap of S2, when the photochromic material is filled to ½ to ⅔ of the volume of the gap, the gap is adjusted to 4 mm, the photochromic material is continuously injected until the gas is filled and sealed with the photochromic material.

S4. The photochromic material is cured by means of ultraviolet irradiation to form the photochromic layer 3.

As can be seen from the above table, the photochromism speed of the lens with a bifocal film obtained by the preparation method for the photochromic lens with a bifocal film layer provided by the present disclosure is faster.

The photochromatic spectrum analysis (fading transmittance detection) of the lenses at two points which are respectively the center and 25 mm away from the center in Embodiment 1 and Comparative Embodiment is conducted, and the results are shown in Table 2. BYK transmission haze meter is used as the detection instrument, and the environmental condition is 20° C.

TABLE 2

Photochromatic spectrum analysis results of lenses
at the center and 25 mm away from the center
in Embodiment 1 and Comparative Embodiment

| Lens | Center | 25 mm away from the center |
|---|---|---|
| Transmittance of lens after ultraviolet irradiation for 90 S | | |
| Comparative Embodiment 1 | 23 | 19 |
| Embodiment 1 | 18 | 18 |

TABLE 2-continued

Photochromatic spectrum analysis results of lenses
at the center and 25 mm away from the center
in Embodiment 1 and Comparative Embodiment

| Lens | Center | 25 mm away from the center |
|---|---|---|
| | Transmittance of lens after fading for 5 min | |
| Lens | Center | 25 mm away from the center |
| Comparative Embodiment 1 | 78 | 74 |
| Embodiment 1 | 83 | 83 |

TABLE 3

Anti-ageing cracking experimental results

| Setting condition | Select the same substrate lens, add photochromic layer directly without treatment layer, and add photochromic layer after treatment layer, and then conduct ageing tolerance test | | | | |
|---|---|---|---|---|---|
| Ageing environment | Humidity 70% | Temperature 80° C. | Total time | 48 h | Observe one time per hour |
| Result | Without treatment layer | After standing for one hour under ageing conditions, the lens cracked, and the substrate was separated from the photochromic layer. | | | |
| | With treatment layer | After standing for 48 hours under the same conditions, no cracking and delamination occurred. | | | |
| Conclusion | It can be seen that the substrate and the photochromic layer do not have good adhesion, but after the treatment layer is applied, the adhesion effect between the substrate and the photochromic layer is greatly increased, and the service life is prolonged. | | | | |

As can be seen from the above tables, the photochromism of the lens with a bifocal film layer obtained by the preparation method for the photochromic lens with the bifocal film layer is more uniform, and the transmittance of the lens at the center point is basically the same as that of the lens 25 mm away from the center, thus ensuring the uniformity of the photochromic film, and the color changes quickly and uniformly in the near light area, while in the Comparative embodiment, the transmittance of the lens at the center point has a certain difference from that of the lens 25 mm away from the center.

The above is only the preferred embodiment of the present disclosure, rather than limiting the present disclosure in any form. Although the present disclosure has been shown in the preferred embodiment, it is not used to limit the present disclosure. A person skilled in the art may use the technical disclosure disclosed in the above to make any variations, or modify the equivalent changes in to equivalent embodiments. Any simple variations, equivalent changes, or modifications made to the foregoing embodiments according to the technical essence a present disclosure without departing from contents of the technical solutions of the present disclosure shall all fall within the scope of the technical solutions of the present disclosure.

What is claimed is:

1. A photochromic lens with a bifocal film layer, comprising a substrate, a treatment layer and a photochromic layer from inside to outside, wherein the photochromic layer is cured on a surface of the treatment layer by means of ultraviolet irradiation, and the substrate is an E-line bifocal lens or a flat-top bifocal lens;

wherein materials of the treatment layer comprise the following components in parts by weight: 50-80 parts of bisphenol A epoxy acrylic resin, 5-8 parts of dioctyl adipate, 2-5 parts of vinyl trimethoxy silane, and 1-3 parts of tetrabutylammonium chloride.

2. The photochromic lens with a bifocal film layer according to claim 1, wherein the substrate comprises a main lens and a segment lens, the main lens is a distance-viewing structure, and the segment lens is a near-viewing part.

3. The photochromic lens with a bifocal film layer according to claim 1, wherein the photochromic layer (3) comprises the following components in mass fraction: 30%-70% of bisphenol A dimethacrylate, 10%-60% of poly(ethylene glycol) diacrylate, 10%-30% of polyfunctional acrylate monomer, and the rest of photoinitiator, with a total of 100%.

4. The photochromic lens with a bifocal film layer according to claim 1, wherein the material of the substrate is an optical transparent polymer material, and the optical transparent polymer material is any one of polycarbonate, polymethylmethacrylate, or polymer alloy.

5. A preparation method for the photochromic lens with a bifocal film layer according to claim 1, comprising the following operation steps:

S1: uniformly spin-coating a treatment layer on surface of a substrate;

S2: placing the substrate obtained in Step S1 in an external mold adapted to a shape and structure of the substrate, reserving a gap between the external mold and the substrate, and fixing the external and the substrate with an adhesive tape;

S3: injecting a photochromic material into the gap of Step S2 to fill and seal the gap;

S4: curing the photochromic material by means of ultraviolet irradiation to form a photochromic layer; and S5: demolding to obtain the photochromic material with a bifocal film layer.

6. The preparation method for the photochromic lens with a bifocal film layer according to claim 5, comprising the following operation steps:

S1: uniformly spin-coating the treatment layer on the surface of the substrate;

S2: placing the substrate obtained in Step S1 in the external mold adapted to the shape and structure of the substrate, reserving a gap of 5 mm between the external mold and the substrate, and fixing the external and the substrate with an adhesive tape;

S3: injecting the photochromic material into the gap of Step S2, adjusting the gap to 4 mm when the photochromic material is filled to $\frac{1}{2}$-$\frac{2}{3}$ of the volume of the gap, wherein the gap is a thickness of the photochromic layer, and continuously injecting the photochromic material until the gap is filled and sealed with the photochromic material;

S4: curing the photochromic material by means of ultraviolet irradiation for 2 min to form the photochromic layer; and S5: demolding to obtain the photochromic material with a bifocal film layer.

7. The preparation method for the photochromic lens with a bifocal film layer according to claim 6, wherein in Step S1, the treatment layer is uniformly spin-coated on the surface of the substrate, and the substrate coated with the treatment layer is irradiated with an ultraviolet curing light source for 1 min.

8. The preparation method for the photochromic lens with a bifocal film layer according to claim 7, wherein in Step S3, an injection hole is punched in the adhesive tape, the photochromic material is injected into the gap through the injection hole with a syringe, and then the hole is sealed with the adhesive tape.

9. The preparation method for the photochromic lens with a bifocal film layer according to claim 7, wherein in Step S3, a vent hole is punched in the adhesive tape, and the vent hole is adjacent to the injection hole; when the photochromic material overflows from the vent hole, the gap is determined to be filled with the photochromic material.

* * * * *